(12) United States Patent
Poe et al.

(10) Patent No.: US 7,935,269 B2
(45) Date of Patent: May 3, 2011

(54) DEICING BLEND AND METHOD OF USING THE SAME

(75) Inventors: Jerry Poe, Hutchinson, KS (US); Douglas N. Excell, Overland Park, KS (US)

(73) Assignee: North American Salt Company, Overland Park, KS (US)

(*) Notice: Subject to any disclaimer, the term of this patent is extended or adjusted under 35 U.S.C. 154(b) by 4 days.

(21) Appl. No.: 12/468,711

(22) Filed: May 19, 2009

(65) Prior Publication Data

US 2010/0294981 A1    Nov. 25, 2010

(51) Int. Cl.
*C09K 3/18* (2006.01)
(52) U.S. Cl. ............................................ 252/70; 106/13
(58) Field of Classification Search .................... 252/70; 106/13
See application file for complete search history.

(56) References Cited

U.S. PATENT DOCUMENTS

| | | | | |
|---|---|---|---|---|
| 3,772,202 A | * | 11/1973 | Neitzel et al. | 252/70 |
| 3,833,504 A | * | 9/1974 | Neitzel et al. | 252/70 |
| 4,668,416 A | * | 5/1987 | Neal | 252/70 |
| 4,960,531 A | * | 10/1990 | Connor et al. | 252/70 |
| 5,135,674 A | * | 8/1992 | Kuhajek et al. | 252/70 |
| 5,645,755 A | * | 7/1997 | Wiesenfeld et al. | 252/70 |
| 5,730,895 A | * | 3/1998 | Moore | 252/70 |
| 5,843,330 A | * | 12/1998 | Barbour et al. | 252/70 |
| 5,851,418 A | * | 12/1998 | Moore | 252/70 |
| 6,039,890 A | * | 3/2000 | Ossian et al. | 252/70 |
| 6,616,739 B1 | * | 9/2003 | Spanos | 252/70 |
| 6,849,199 B2 | * | 2/2005 | Vickers et al. | 252/70 |
| 2006/0060664 A1 | * | 3/2006 | Valiton et al. | 239/142 |

FOREIGN PATENT DOCUMENTS

| | | | | |
|---|---|---|---|---|
| CA | 2049722 A | * | 2/1992 | |
| CA | 1306340 | | 8/1992 | |
| DE | 122963 A | * | 10/1992 | |
| SU | 1560540 A | * | 4/1990 | |

* cited by examiner

*Primary Examiner* — Anthony J Green
(74) *Attorney, Agent, or Firm* — Hovey Williams LLP

(57) ABSTRACT

Novel deicing compositions and methods of using and forming those compositions are provided. The compositions comprise a blend of NaCl, KCl, and $MgCl_2$, with the NaCl preferably being coated with a solution comprising an ice melt trigger and/or urea. The deicing composition has low corrosion, particularly when compared to a NaCl solution. At the same time, the compositions have superior melt properties compared to NaCl solutions as well as other prior art deicers. The deicing compositions are useful for melting ice on surfaces such as roadways.

18 Claims, 2 Drawing Sheets

DEICING BLEND AND METHOD OF USING THE SAME

BACKGROUND OF THE INVENTION

1. Field of the Invention

The present invention is concerned with novel deicing compositions and methods of using those compositions to deice surfaces such as roadways.

2. Description of the Prior Art

Deicing compositions have been used for some time to melt ice on sidewalks, roadways, and other surfaces. One such prior art deicing method has involved the application of NaCl to the surfaces. However, this and other prior art methods are lacking in that they are highly corrosive to metal surfaces. Thus, vehicles driven on roadways treated with these prior art compositions are often damaged over time due to repeated contact with the composition.

Alternative compositions have been attempted, using compositions that are less corrosive. However, these alternatives fall short in that they do not have sufficient ice-melting properties. This results in ice remaining on treated surfaces longer than is desirable. When that surface is a roadway, the result is prolonged dangerous driving conditions after a snow or ice storm. When that surface is a sidewalk, the risk of a pedestrian falling and being injured is also prolonged after the storm.

There is a need for a deicing composition with decreased corrosivity compared to prior art products, while at the same time possessing rapid melt properties.

SUMMARY OF THE INVENTION

The present invention broadly provides a deicing composition comprising a mixture including NaCl, KCl, and $MgCl_2$. The mixture comprises: a weight ratio of NaCl:KCl of from about 10:1 to about 20:1; and a weight ratio of $MgCl_2$:KCl of from about 2:1 to about 6:1.

The present invention further provides a deicing method comprising contacting a deicing composition with ice. Again, the deicing composition comprises am mixture including NaCl, KCl, and $MgCl_2$. The mixture comprises: a weight ratio of NaCl:KCl of from about 10:1 to about 20:1; and a weight ratio of $MgCl_2$:KCl of from about 2:1 to about 6:1.

Finally, the invention provides a method of forming a deicing composition. This method comprises contacting a solution including an ice melt trigger with a first salt to yield a coated first salt. The coated first salt is blended with second and third salts, with the second and third salts being different from one another and different from the coated first salt.

DETAILED DESCRIPTION OF THE PREFERRED EMBODIMENTS

Figure 1:
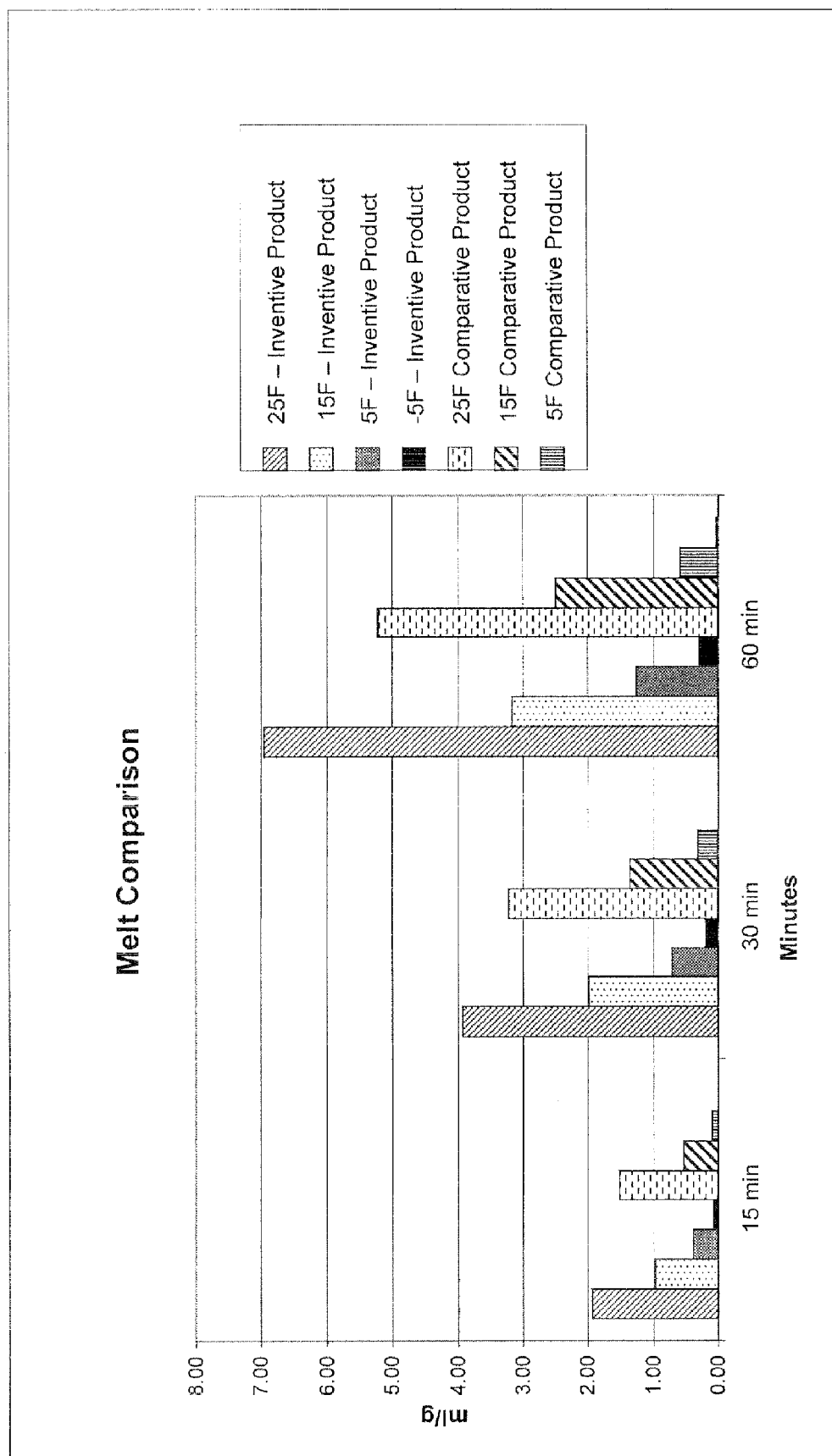
FIG. 1 is a graph comparing the melt performance of the inventive product at varying times and temperatures to a comparative product.

In more detail, the deicing composition comprises a salt mixture. The salt mixture comprises three different salts, with NaCl, KCl, and $MgCl_2$ being preferred. Preferably, the weight ratio of NaCl:KCl is from about 10:1 to about 20:1, more preferably from about 12:1 to about 18:1, and even more preferably from about 14:1 to about 16:1. The weight ratio of $MgCl_2$:KCl is from about 2:1 to about 6:1, preferably from about 3:1 to about 5:1, and even more preferably from about 4:1 to about 4.5:1.

In another aspect, the salt mixture will comprise the following weight ranges of individual salts:

| SALT | BROADEST RANGE[A] | PREFERRED RANGE[A] | MOST PREFERRED RANGE[A] |
| --- | --- | --- | --- |
| NaCl | from about 50 to about 98 | from about 60 to about 90 | from about 75 to about 85 |
| KCl | from about 1 to about 25 | from about 2 to about 15 | from about 3 to about 10 |
| $MgCl_2$ | from about 1 to about 50 | from about 5 to about 30 | from about 15 to about 25 |

[A]Ranges are given as percentages by weight, based upon the total weight of all salts present in the composition taken as 100% by weight.

The salts are preferably provided as discrete salt pieces. The NaCl preferably has an average size of from about 30 mesh to about ½ inch, and more preferably from about 30 mesh to about ¼ inch. The KCl pieces will have an average size similar to that of the NaCl. The $MgCl_2$ preferably has an average size of from about 2 mesh to about 12 mesh, and more preferably from about 4 mesh to about 6 mesh.

In another embodiment, it is preferred that the composition comprise an ice melt trigger. An ice melt trigger is one that causes the deicing composition to perform at lower temperatures than would be expected without the trigger, thus accelerating the melting of the ice. Preferred such triggers include those selected from the group consisting of inorganic salts (e.g., a carbonate or an additional chloride such as potassium carbonate, lithium chloride, or magnesium chloride hexahydrate); an organic compound containing an ether group or a hydroxyl group; compounds with groups selected from the group consisting of saccharides, alcohols, glycols and glucosides, and mixtures of the foregoing. The preferred ice melt trigger is a glucoside, and preferably α-methyl glucoside.

It is preferred that the ice melt trigger is coated on the surface of at least one of the salts, and most preferably on the surface of the NaCl. The ice melt trigger is preferably present in the deicing composition at a level of from about 0.1% by weight to about 1% by weight, and more preferably from about 0.25% to about 0.5% by weight, based upon the total weight of the deicing composition taken as 100% by weight.

In addition to the salt mixture, the composition preferably also comprises urea. Furthermore, to is preferred th at the urea is coated on the surface of at least one of the salts; and most preferably on the surface of the NaCl. The urea is preferably present in the deicing composition at a level of from about 0.1% by weight to about 1% by weight, and more preferably from about 0.25% to about 0.5% by weight, based upon the total weight of the deicing composition taken as 100% by weight.

In a particularly preferred embodiment, the deicing composition comprises both urea and an ice melt trigger.

The composition can also include a number of optional ingredients. One such ingredient is a desiccant to absorb moisture from the composition. One preferred desiccant is SiO$_2$. When a desiccant is present, it is preferably used at levels of from about 0.05% by weight to about 0.3% by weight, and preferably from about 0.1% by weight to about 0.2% by weight, based upon the total weight of the deicing composition taken as 100% by weight.

The inventive composition is prepared by simply combining the three salts together. Since it is preferred that urea also be present in the composition, it is preferred that prior to mixing of the salts, the urea is heated to a temperature of from about 90° F. to about 110° F., and more preferably from about 95° F. to about 105° F., and then applied to the surface of one of the salts (preferably the NaCl). After applying the urea to one of the salts, the remaining two salts (typically the KCl and MgCl$_2$) would then be mixed with the coated first salt. It will be appreciated that this coating can be accomplished in a number of ways, including spraying the salt with the solution as it is being conveyed.

Even more preferably, the heated urea solution is first mixed with the ice melt trigger. After mixing to form a substantially uniform solution, the combined solution is then sprayed on the particular salt, followed by blending of the salts. If a desiccant is utilized, it is mixed during this blending step.

The method of using the deicing composition comprises simply contacting the composition with ice. The ice would typically be present on any number of surfaces, including asphalt and concrete surfaces. Exemplary surfaces include those selected from the group consisting of roadways, sidewalks, driveways, stairs, ramps, decks, docks, and most horizontal surfaces.

The following examples set forth preferred methods in accordance with the invention. It is to be understood, however, that these examples are provided by way of illustration and nothing therein should be taken as a limitation upon the overall scope of the invention.

1. Preparation of Comparative Product

A salt product was formed by first melting urea by heating to a temperature of 100° F. Next, α-methyl glucoside (sold under the name MG-104 by Specialty Products international, Inc., Macungie, Pa.) was mixed with the hot urea until uniform. The resulting mixture was sprayed onto ambient NaCl pieces, having an average size of about 30 mesh to about ½ inch. Finally, KCl pieces having an average size of from about 30 mesh to about ½ inch were mixed with the coated NaCl until uniform.

The amount of each ingredient is shown in Table 1.

TABLE 1

| INGREDIENT | % BY WEIGHT |
|---|---|
| NaCl | 49.5 |
| KCl | 50.0 |
| α-Methyl Glucoside | 0.25 |
| Urea | 0.25 |

2. Preparation of Product According to Invention

A prior art product was formed by first melting urea by heating to a temperature of 100° F. Next, α-methyl glucoside was mixed with the hot urea until uniform. The resulting mixture was sprayed onto ambient NaCl pieces, having an average size of about 30 mesh to about ½ inch. KCl pieces having an average size of from about 30 mesh to about ½ inch and MgCl$_2$ pieces having an average size of from about 2 mesh to about 12 mesh were mixed with the coated NaCl until uniform. SiO$_2$ (desiccant) was mixed in at the same time as the KCl and MgCl$_2$ pieces.

The amount of each ingredient is shown in Table 2.

TABLE 2

| INGREDIENT | % BY WEIGHT |
|---|---|
| NaCl | 74.4 |
| KCl | 5.0 |
| MgCl$_2$ | 20 |
| α-Methyl Glucoside | 0.25 |
| Urea | 0.25 |
| SiO$_2$ | 0.1 |

3. Melt Comparison

The products prepared in Parts 1 and 2 above were tested for melt performance. In this procedure (referred to as the "melt test"), a shallow bowl containing 130 ml of water was placed in a freezer at either −5° F., 5° F., 15° F., or 25° F., and the water was allowed to freeze. After it was frozen, 4.17 g of the deicer to be tested was placed on top of the frozen water. After 15 minutes, 30 minutes, or 60 minutes, a syringe was used to withdraw the melted water. The quantity in ml of melted water from each sample was measured, and these results (ml of melted water per g of deicer) are shown in FIG. 1.

A significant improvement of melt performance of the inventive product (prepared in Part 2 above) was observed compared to the comparative product (prepared in Part 1 above). This improvement was observed at all temperatures and times, and it was dramatic and unexpected. For example, at 25° F. and 60 minutes, the inventive product outperformed the comparative product by 33%, while at 60 minutes and −5° F. the inventive product showed an improvement of 14.5 times over the comparative product. The comparative product did not melt ice at −5° F. within 15 or 30 minutes. It only melted 0.02 ml of water per gram of product at −5° F. when given 60 minutes.

4. Corrosion Testing

The deicers prepared in Parts 1 and 2 above were tested for corrosion using the "Corrosion Test," which is described below. In this procedure, the following five test solutions were prepared:

(1) 300 ml distilled water;
(2) 300 ml distilled water containing 3% by weight of reagent grade NaCl;
(3) 300 ml distilled water containing 3% by weight of reagent grade MgCl$_2$;
(4) 300 ml distilled water containing 3% by weight of the deicer prepared in Part 1 (comparative product) above; and
(5) 300 ml distilled water containing 3% Dy weight of the deicer prepared in Part 2 (inventive product) above.

The test solutions were placed in an ultra sonic bath for 10 minutes and then allowed to sit overnight before testing to ensure stability.

Steel coupons (shaped like washers) free of flaws and abnormalities were tested to determine their respective hardnesses using a Rockwell Hardness Tester (load selector at 150 kg). The coupons were marked by engraving for later identification, and this was repeated until a total of 15 coupons (3 for each of the above solutions) had been prepared and tested.

Next, the coupons were prepared for testing by etching the coupons for 3 minutes in a 1:1 HCl acid solution. She coupons were then rinsed in tap water, rinsed in distilled water, wiped dry, and placed in chloroform for 15 minutes. The coupons were removed from the chloroform and allowed to air dry in a vent hood for 15 minutes. The coupons were then measured using a Mitutoyo Mini-Processor and Caliper and those values were recorded. Two measurements each were taken at 90 degrees from each other of the thickness, internal diameter, and external diameter, and the average of each measurement was used. The coupons were then weighed to a constant weight (i.e., until two consecutive weights within 0.5 mg of each other were obtained).

Three coupons were submerged in each of the test solutions for 10 minutes every hour over the course of 72 hours. After 72 hours, the coupons were placed in respective beakers containing 50 ml of a cleaning solution containing 50 g stannous chloride and 20 g antimony trichloride dissolved in 500 ml HCl (brought up to volume in a 1,000-ml volumetric flask). After 15 minutes of agitation in the cleaning solution, the solution was removed from the beaker and saved for reuse. The coupons were then rinsed with tap water, rinsed with deionized water, dried with a cloth towel, and returned to their respective beakers. This cleaning process was repeated entirely, reusing the cleaning solution, after which the cleaning solution was removed and chloroform was added to the beakers (covering the coupons) where it was allowed to remain for 15 minutes under agitation. The coupons were then allowed to dry on a paper towel under a vent hood for 15 minutes. After drying, the coupons were weighed to a constant weight again, with the two weights for each coupon being recorded.

Figure 2:
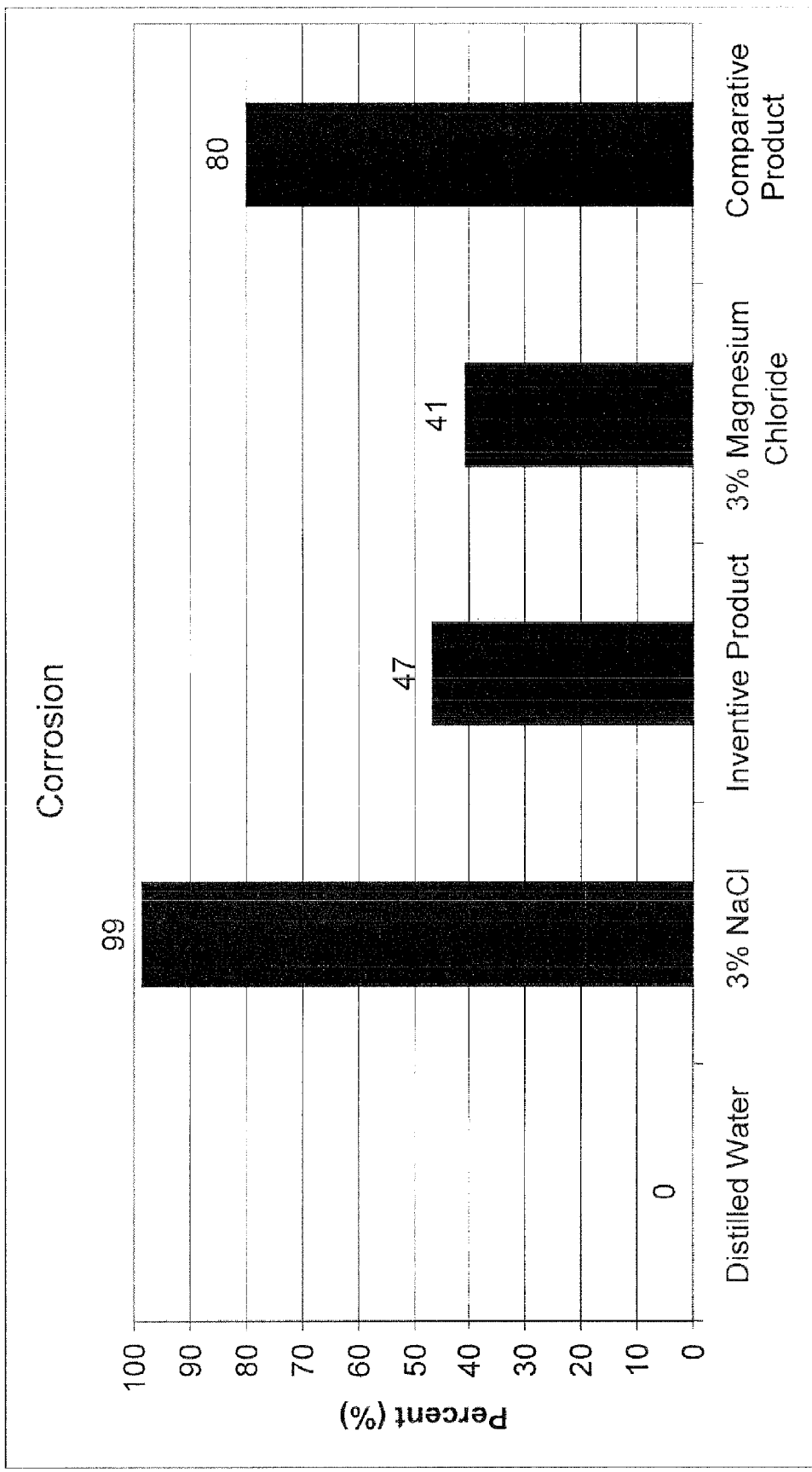
FIG. 2 is a graph showing the corrosion testing results of the inventive product compared to several other formulations.

The following calculations were carried out to determine the percent corrosion for each test solution, with that percentage being shown in FIG. 2.

a. Surface Area ("SA") Calculations $$\text{Surface Area} = (3.1416/2)(D^2 - d^2) + 3.1416(t)(D) + 3.1416(t)(d)$$

Where:
(D)=average external diameter;
(d)=average internal diameter;
(t)=average thickness; and
surface area is in square inches.

b. Metal Density $$\text{Metal Density} = \text{average weight}/V_{cm}^3$$

Where:
$V_{cm}^3 = V_{in}^3 * (2.54 \text{ cm}/1 \text{ in})^3$;
$V_{in}^3 = A*t$; and
$A = (3.1416*(D/2)^2) - (3.1416*(d/2)^2)$, Metal density for steel should be around 7.85 g/cm³.

c. Mils Penetration Per Year ("MPY")

$$\text{MPY} = (\text{weight loss(mg)})(534)/((\text{surface area})(\text{time})(\text{metal density}))$$

Where:
surface area is in square inches;
time is in hours; and
metal density is in g/cm³.

The final MPY value for each solution is determined by calculating the average of the three individual coupons. A wide variation of MPY of individual coupons inside the same flask typically indicates contamination of a coupon. A coupon variation of ±3 MPY is considered acceptable. The test is repeated with new coupons if a greater variance is achieved.

d. Corrected MPY $$\text{Corrected MPY} = \text{MPY}_{test\ solution} - \text{MPYDI}_{DI\ water}$$

e. % Compared to NaCl $$\%\ \text{Compared to NaCl} = (\text{corrected MPY}_{solution}/\text{corrected MPY}_{NaCl}) * 100$$

We claim:

1. A deicing composition comprising:
a mixture including NaCl, KCl, and $MgCl_2$, said mixture comprising:
a weight ratio of NaCl:KCl of from about 10:1 to about 20:1; and
a weight ratio of $MgCl_2$:KCl of from about 2:1 to about 6:1;
from about 0.1% to about 1% by weight urea; and
from about 0.1% to about 1% by weight ice melt trigger, said percentages by weight being based upon the total weight of the composition taken as 100% by weight.

2. The composition of claim 1, said urea being coated on at least one of said NaCl, KCl, and $MgCl_2$.

3. The composition of claim 1, said ice melt trigger being coated on at least one of said NaCl, KCl, and $MgCl_2$.

4. The composition of claim 1, said ice melt trigger being selected from the group consisting of α-methyl glucoside, potassium carbonate, lithium chloride, magnesium chloride hexahydrate, and mixtures thereof.

5. The composition of claim 1, said ice melt trigger comprising α-methyl glucoside.

6. The composition of claim 1, wherein said composition gives a corrosion test result that is at least about 25% less than the corrosion test result of a solution comprising 3% by weight NaCl in water.

7. The composition of claim 1, wherein said composition gives a melt test result of at least about 6.0 ml of water per gram of composition at 25° F. for 60 minutes.

8. A deicing method comprising contacting a deicing composition with ice, said deicing composition comprising:
a mixture including NaCl, KCl, and $MgCl_2$, said mixture comprising:
a weight ratio of NaCl:KCl of from about 10:1 to about 20:1; and
a weight ratio of $MgCl_2$:KCl of from about 2:1 to about 6:1;
from about 0.1% to about 1% by weight urea; and
from about 0.1% to about 1% by weight ice melt trigger, said percentages by weight being based upon the total weight of the composition taken as 100% by weight.

9. The method of claim 8, wherein said ice is present on a surface.

10. The method of claim 8, wherein at about 15 minutes after said contacting and at temperatures of from about 25° F. to about 32° F., said composition melts at least about 1.5 ml of water per gram of composition.

11. The method of claim 8, wherein said composition gives a corrosion test result that is at least about 25% less than the corrosion test result of a solution comprising 3% by weight NaCl in water.

12. The method of claim 8, wherein said composition gives a melt test result of at least about 6.0 ml of water per gram of composition at 25° F. for 60 minutes.

13. The method of claim 8, said urea being coated on at least one of said NaCl, KCl, and $MgCl_2$.

14. The method of claim 8, said ice melt trigger being coated on at least one of said NaCl, KCl, and $MgCl_2$.

15. The method of claim 8, said ice melt trigger being selected from the group consisting of α-methyl glucoside, α-methyl glucoside, potassium carbonate, lithium chloride, magnesium chloride hexahydrate, and mixtures thereof.

16. The method of claim 8, said ice melt trigger comprising α-methyl glucoside.

17. A deicing composition comprising urea and a mixture including NaCl, KCl, and $MgCl_2$, said urea being coated on at least one of said NaCl, KCl, and $MgCl_2$, wherein said mixture comprises:
a weight ratio of NaCl:KCl of from about 10:1 to about 20:1; and
a weight ratio of $MgCl_2$:KCl of from about 2:1 to about 6:1.

18. A deicing method comprising contacting a deicing composition with ice, said deicing composition comprising urea and a mixture including NaCl, KCl, and $MgCl_2$, said urea being coated on at least one of said NaCl, KCl, and $MgCl_2$, wherein said mixture comprises:

a weight ratio of NaCl:KCl of from about 10:1 to about 20:1; and a weight ratio of $MgCl_2$:KCl of from about 2:1 to about 6:1.

* * * * *